United States Patent
Ghose et al.

(10) Patent No.: US 10,520,330 B2
(45) Date of Patent: Dec. 31, 2019

(54) ESTIMATION OF DIRECTION OF MOTION OF USERS ON MOBILE DEVICES

(71) Applicant: TATA CONSULTANCY SERVICES LIMITED, Mumbai (IN)

(72) Inventors: Avik Ghose, Kolkata (IN); Abhinav Kumar, Kolkata (IN); Chirabrata Bhaumik, Kolkata (IN); Arpan Pal, Kolkata (IN)

(73) Assignee: TATA CONSULTANCY SERVICES LIMITED, Mumbai, MH (IN)

( * ) Notice: Subject to any disclaimer, the term of this patent is extended or adjusted under 35 U.S.C. 154(b) by 611 days.

(21) Appl. No.: 14/595,116

(22) Filed: Jan. 12, 2015

(65) Prior Publication Data
US 2015/0198625 A1 Jul. 16, 2015

(30) Foreign Application Priority Data
Jan. 13, 2014 (IN) .............................. 117/MUM/2014

(51) Int. Cl.
*G01C 22/00* (2006.01)
*G01C 21/16* (2006.01)

(52) U.S. Cl.
CPC ........... *G01C 22/006* (2013.01); *G01C 21/16* (2013.01)

(58) Field of Classification Search
CPC .............................. G01C 22/006; G01C 21/16
See application file for complete search history.

(56) References Cited

U.S. PATENT DOCUMENTS

| | | | | |
|---|---|---|---|---|
| 2003/0197124 A1* | 10/2003 | Wood | ............... | H01L 27/14625 250/332 |
| 2004/0125085 A1* | 7/2004 | Kotzin | ................. | G06F 1/1626 345/169 |
| 2008/0172203 A1* | 7/2008 | Jorgensen | ........... | G01C 22/006 702/160 |
| 2009/0164219 A1* | 6/2009 | Yeung | ................... | G04C 3/002 704/258 |

(Continued)

OTHER PUBLICATIONS

Roy et. al. "I am a smartphone and I can tell my user's walking direction" Jun. 16, 2014, Bretton Woods, Mobisys '14 pp. 329-342.*

(Continued)

*Primary Examiner* — Douglas King
(74) *Attorney, Agent, or Firm* — Workman Nydegger

(57) ABSTRACT

A mobile device and a method for estimation of direction of motion of a user are described. The mobile device comprises an inertial sensor to capture acceleration signals based on motion of the user and a direction estimation module. The direction estimation module determines direction of gravity based on filtering acceleration values obtained from captured the acceleration signals using a low-pass filter to identify a plane orthogonal to the direction of gravity. The plane orthogonal to the gravity comprises two orthogonal axes orthogonal to the direction of gravity. Further, displacement values are evaluated based on a user input for placement of the mobile device with respect to user's body, and integration of the acceleration values across the two orthogonal axes with respect to time. A direction of motion of the user is estimated based on a ratio of the displacement values along the two orthogonal axes.

7 Claims, 3 Drawing Sheets

(56) References Cited

U.S. PATENT DOCUMENTS

| | | | | |
|---|---|---|---|---|
| 2010/0161271 A1* | 6/2010 | Shah | .................... | A61B 5/112 |
| | | | | 702/141 |
| 2012/0026402 A1* | 2/2012 | Zhong | .................... | H04N 5/145 |
| | | | | 348/607 |
| 2012/0083705 A1* | 4/2012 | Yuen | .................... | A61B 5/0002 |
| | | | | 600/508 |
| 2012/0259578 A1* | 10/2012 | Bevilacqua | ........... | G06F 1/1694 |
| | | | | 702/141 |
| 2013/0158941 A1 | 6/2013 | Yang et al. | | |
| 2013/0311133 A1 | 11/2013 | Kordari et al. | | |
| 2014/0093093 A1* | 4/2014 | Dusan | .................... | H04R 3/005 |
| | | | | 381/74 |

OTHER PUBLICATIONS

Heravi, B.M.; Bahraminasab, A.; Honary, B, Lancaster Univ., UK., Pedestrian Direction of Movement Determination Using Smartphone, Sep. 12, 2012.

Shahid Ayub, Alireza Bahraminisaab , and Bahram Honary, Lancaster Univ., UK., A Sensor Fusion Method for Smart phone Orientation Estimation, 2012, Abstract, p. 2 Section B, p. 5 Section IV.

* cited by examiner

ESTIMATION OF DIRECTION OF MOTION OF USERS ON MOBILE DEVICES

CROSS-REFERENCE TO RELATED APPLICATION

This application claims priority to and the benefit of Indian Patent Application No. 117/MUM/2014, entitled "Estimation of Direction of Motion of Users on Mobile Devices" filed on Jan. 13, 2014, which is incorporated by reference herein in its entirety.

TECHNICAL FIELD

The present subject matter relates, in general, to estimation of direction of motion of individuals and, particularly but not exclusively, to estimation of direction of motion of users on mobile devices.

BACKGROUND

With the trend towards ubiquitous computing, context awareness is becoming a key factor in applications that involve localization of individuals based on estimating direction of motion of the users. Estimating direction of motion of individuals, for example, using smartphones or other similar mobile devices make use of the embedded global positioning system (GPS) and/or inertial sensors, for example, accelerometers.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer same features and components.

Figure 1A:
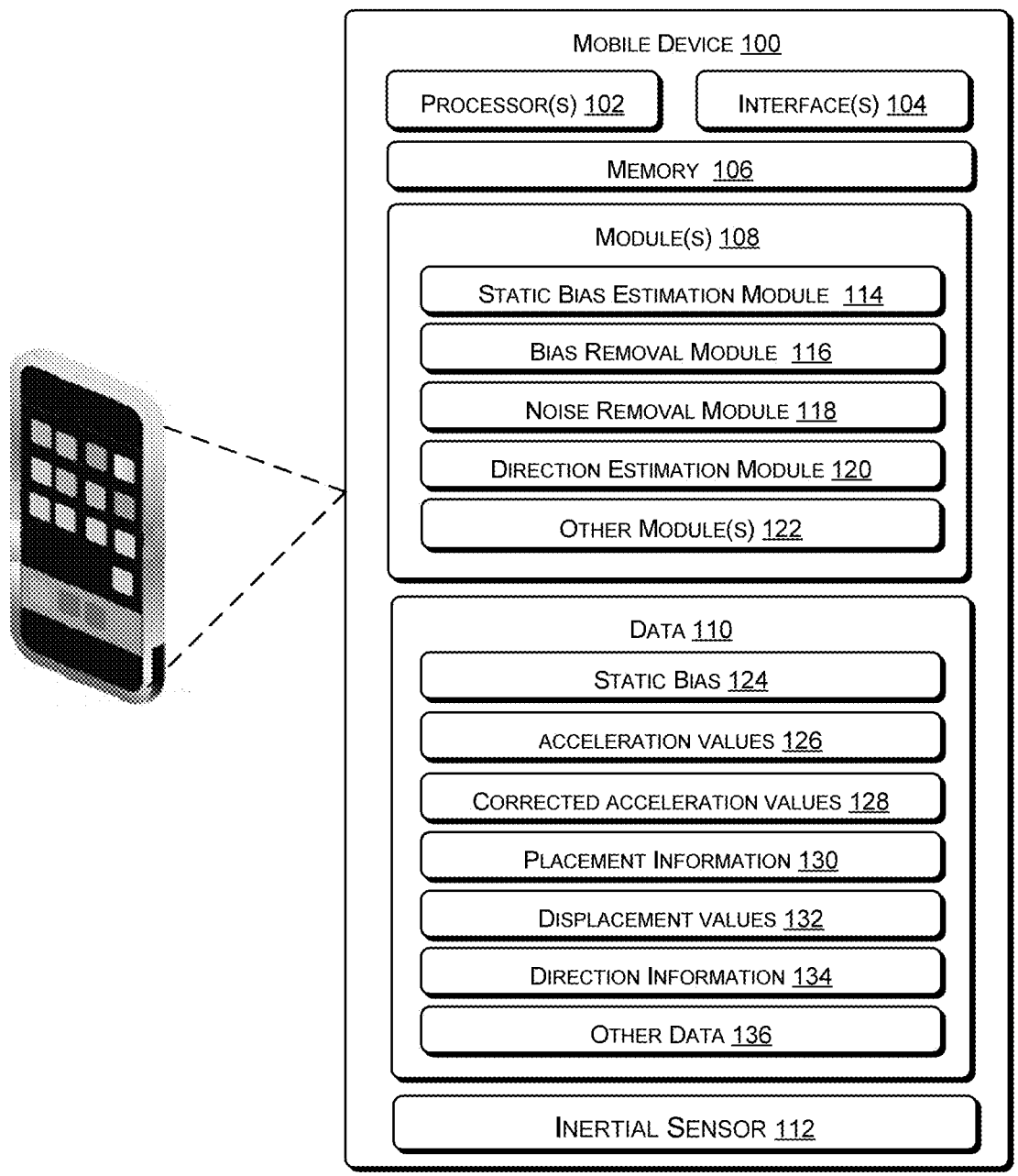
FIG. 1(a) illustrates a mobile device for estimation of direction of motion of users, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Conventional methodologies for estimating direction of motion of individuals make use of the embedded GPS and inertial sensors, for example, accelerometers. However, information pertaining to the direction of motion of individuals obtained through GPS is only reliable in certain outdoor environments because of direct visibility to the satellites. The data of inertial sensors is generally too noisy to obtain accurate location information.

Pedestrian navigation system is a conventional system for estimating and monitoring direction of motion of pedestrians using inertial sensors. In the pedestrian navigation system direction of motion of pedestrians is estimated based on aggregation of individual steps of movement of the pedestrians. Step detection typically relies on peak detection over inertial sensor data, which is sensitive to noise and other irrelevant motion, producing a high rate of false positives. Further, the pedestrian navigation system relies on a dedicated inertial sensor device placed on the user body for tracking.

Recently, certain advanced methodologies for pedestrian navigation have exploited widely available mobile devices such as smartphones with accelerometer for estimating direction of motion of pedestrians. However, implementing such a pedestrian navigation system on smartphones faces significant challenges. For example, while the pedestrian is walking, the position of the smartphone, such as in a hand or a pocket, can affect the sensor readings. This may leads to unreliable detection across different positions of the smartphone. Further, the data of the accelerometers embedded in the smartphones is too noisy, and thus leads to inaccuracies in the localization of pedestrians.

In accordance with the present subject matter, a mobile device for estimation of direction of motion of a user, and a method for estimation of direction of motion of a user on the mobile device are described.

The mobile devices referred herein include smartphones, personal digital assistants (PDA), tablet computers, or other portable or hand-held computing devices equipped with inertial sensors. The inertial sensor includes an accelerometer used for measuring acceleration-based movements or motions of the user. Micro-Electro-Mechanical Systems (MEMS) technology has enabled the manufacture of the inertial sensors of size that fits into the mobile devices. Such inertial sensors have low cost and low power consumption. In the context of the present subject matter, the user can be an individual who is walking/moving and carrying the mobile device in his hand, shirt pocket, trouser pocket, waist pocket, or phone holder tied to waist, etc.

According to an embodiment of the present subject matter, acceleration values across three axes of the mobile device are measured by the inertial sensor in the mobile device. In an implementation, for measurement of acceleration values, acceleration signals, representing the motion of the user, are captured by the inertial sensor in the form of a data stream. The data stream of the acceleration signals from the inertial sensor is divided into time windows of a predetermined time period. The acceleration signals are then processed as per the time windows to obtain acceleration values. The acceleration signals captured by the inertial sensors are generally too noisy, and may include a static bias as well when the mobile device is at rest. The measured acceleration values are therefore corrected, according to said embodiment, by removing the static bias and the noise therefrom, prior to further processing. As apparent, the correction is performed for the acceleration values obtained across all the three axes of the mobile device.

The acceleration values obtained after removing the static bias and the noise are hereinafter referred to as corrected acceleration values. These corrected acceleration values are then used for determining the direction of gravity. Determination of direction of gravity is performed by filtering the corrected acceleration values using a low-pass filter. With this, the gravity components are filtered out from the acceleration values. The gravity components mentioned herein refer to acceleration values that are contributed by the acceleration due to gravity along the three axes.

Determination of the gravity components can further lead to determination of gravity and its direction, which enables determination of a plane orthogonal to the direction of gravity. Such a plane includes two axes being orthogonal to the direction of gravity. These axes are hereinafter referred to as orthogonal axes.

Subsequent to determination of the two orthogonal axes of the plane, values of displacement along each of the two orthogonal axes are determined. In one implementation, determination of displacement values depends on position at which the mobile device is placed with respect to user's body. This dependency has been determined based on observing a model of an individual's walk. As per the observation, during the walk, foot of an individual pushes a ground backwards. This in turn generates a reaction force to propel the individual forward. However, this reaction force is felt in the lower half of the body. Thus, the inertial sensor when in contact with lower half of the body, experiences a force forward. While, the upper half of the body, which is dragged due to the motion excited by the lower half of the body feels an inertial force backwards. Since an individual's body temporarily comes to rest during each step, this process gets repeated. Thus, the force observed in the upper half of the body is opposite with respect to the true direction of motion.

Accordingly, if the mobile phone is placed in the upper half of the body, say, in a shirt pocket or a waist pouch, or lower half of the body, say, in a trouser pocket, such positions of the mobile device with respect to the user's body will influence the displacement values. Therefore, in order to nullify the impact or influence of the position of the mobile device on the displacement values, and to calculate the true displacement values, user input regarding placement of the mobile device with respect to user's body is received, and then a scaling by a predetermined value is performed on the acceleration values, along the axis of motion. In one implementation, the predetermined value is +1 and −1. In said implementation, if the mobile phone is placed somewhere near to the upper half body of the user, say from head to waist, then a value −1 is multiplied to each of the corrected acceleration values, along the axis of motion, and if the mobile phone is placed somewhere near to the lower half of the body, say below waist, then a value 1 is multiplied to the corrected acceleration values to scale the acceleration values, along the axis of motion.

Further, in an implementation, the determination of the displacement values are based on integration of the corrected acceleration values across the three axes of the mobile device, with respect to time. In said implementation, the acceleration values are integrated with respect to time to obtain values of velocity, and then the values of velocity are integrated with respect to time to obtain displacement values along each of the two orthogonal axes of the plane. Ratio of the displacement values along the two orthogonal axes provides direction of motion of the user.

As described above, the mobile device and the method according to the present subject mater processes the accelerometer data to eliminate noise and static bias therefrom, and rely on the displacement values obtained after processing and scaling the accelerometer data to identify or estimate the direction of motion of the user. The estimated direction of motion is, thus, free from errors, and estimation can be performed accurately irrespective of where the mobile device is placed with respect to the user's body. The estimated direction of motion can be taken as an input by a variety of applications requiring indoor as well as outdoor localization of the users.

Figure 1B:
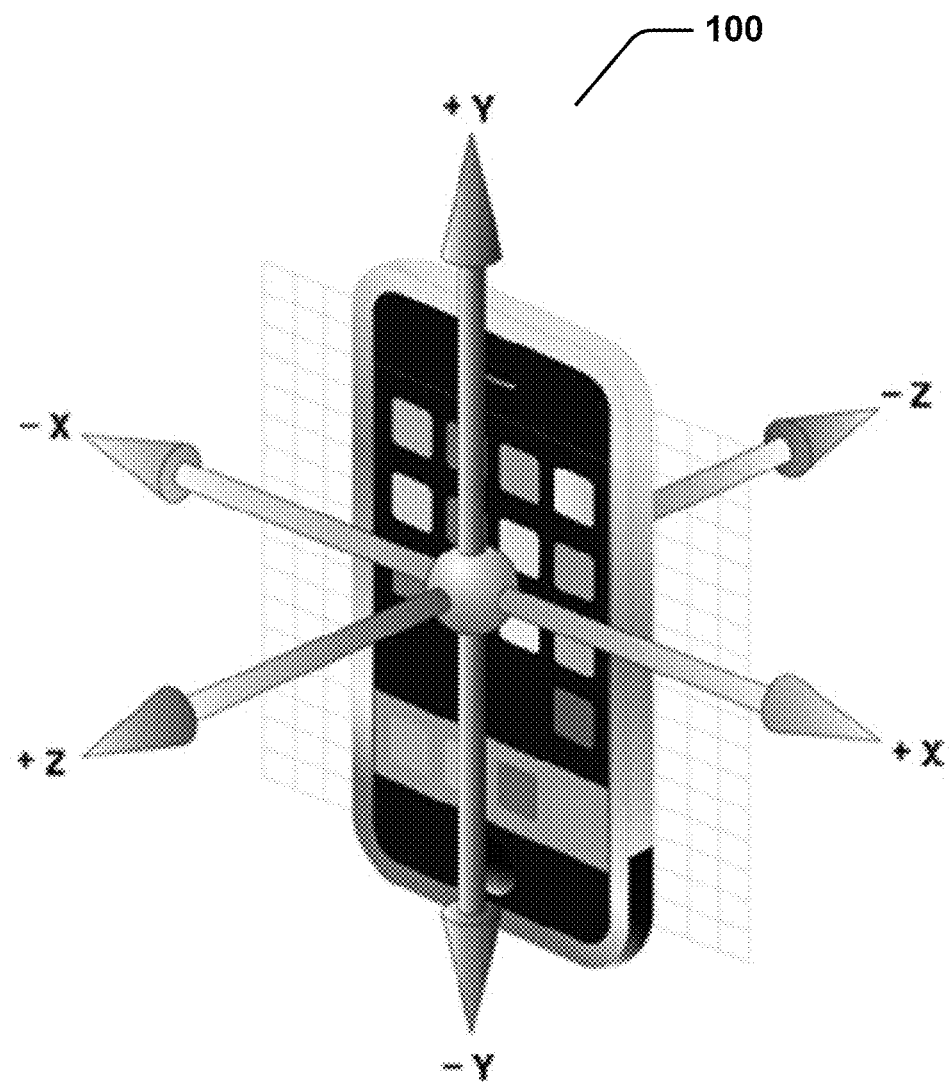
FIG. 1(b) illustrates three axes of the mobile device, in accordance with an embodiment of the present subject matter.
Figure 2:
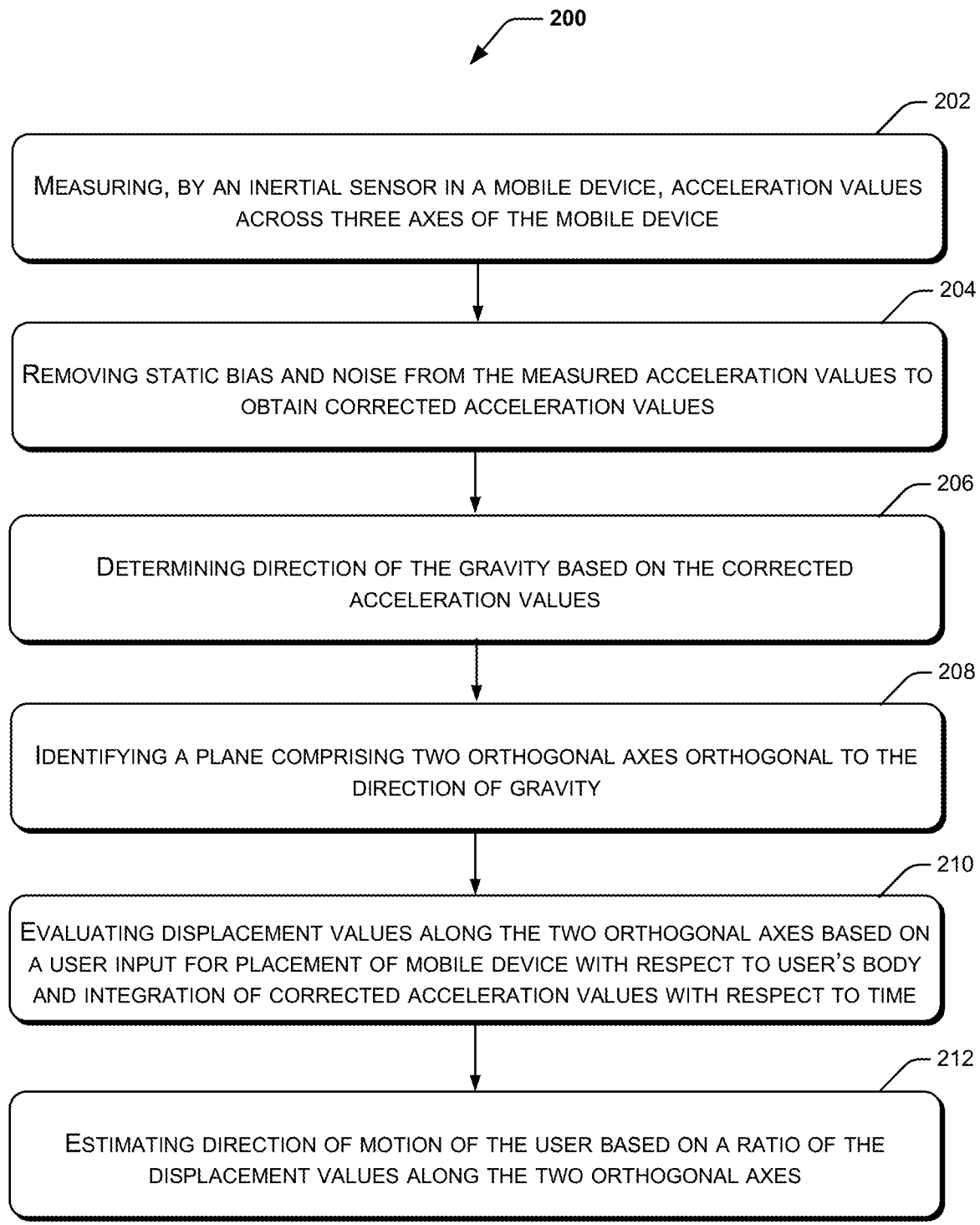
FIG. 2 illustrates a method for estimation of direction of motion of a user on a mobile device, in accordance with an embodiment of the present subject matter.

The manner in which the mobile device and method has been implemented is explained in detail with respect to FIG. 1 and FIG. 2. The aspects of described methods can be implemented in any number of different portable or hand-held computing and/or communication devices equipped with inertial sensors.

FIG. 1(a) illustrates a mobile device 100 for estimation of direction of motion of users, in accordance with an implementation of the present subject matter. In an implementation, the mobile device 100 is a device having an inertial sensor 112 and can be carried by the user while walking. The mobile device 100 may include a smartphone, a portable or hand-held computing and/or communication device equipped with inertial sensor. The user may hold the mobile device 100 is his hand, or place the mobile device 100 in a pocket or a bag, or may couple the mobile device 100 using a coupling means to the body.

In an implementation, the mobile device 100 includes processor(s) 102. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions stored in a memory.

The mobile device 100 further includes interface(s) 104. The interface(s) 104 may include a variety of machine readable instruction-based and hardware-based interfaces that allow the mobile device 100 to communicate with other devices, including servers, data sources and external repositories. Further, the interface(s) 104 may enable the mobile device 100 to communicate with other communication devices, such as network entities, over a communication network.

Further, the mobile device 100 includes a memory 106. The memory 106 may be coupled to the processor(s) 102. The memory 106 can include any computer-readable medium known in the art including, for example, volatile memory, such as static random access memory (SRAM) and dynamic random access memory (DRAM), and/or non-volatile memory, such as read only memory (ROM), erasable read only memory (ROM), erasable programmable ROM, flash memories, hard disks, optical disks, and magnetic tapes.

Further, the mobile device 100 includes module(s) 108 and data 110. The module(s) 108 and the data 110 may be coupled to the processor(s) 102. The module(s) 108, amongst other things, include routines, programs, objects, components, data structures, etc., which perform particular tasks or implement particular abstract data types. The module(s) 108 may also be implemented as, signal processor(s), state machine(s), logic circuitries, and/or any other device or component that manipulate signals based on operational instructions. The data 110 serves, amongst other things, as a repository for storing data that may be fetched, processed, received, or generated by the module(s) 108. Although the data 110 is shown internal to the mobile device 100, it may be understood that the data 110 can reside in an external repository (not shown in the Figure), which may be coupled to the mobile device 100. The mobile device 100 may communicate with the external repository through the interface(s) 104.

Further, the module(s) 108 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform tasks or, the processing unit can be dedicated to perform the required functions. In another aspect of the present subject matter, the module(s) 108 may be machine-readable instructions (software) which, when executed by a processor/processing unit, perform any of the desired functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

In an implementation, the module(s) 108 include a static bias estimation module 114, a bias removal module 116, a noise removal module 118, a direction estimation module 120, and other module(s) 122. The other module(s) 122 may include programs or coded instructions that supplement applications or functions performed by the mobile device 100. In said implementation, the data 110 includes static bias 124, acceleration values 126, corrected acceleration values 128, placement information 130, displacement values 132, direction information 134, and other data 136. The other data 136 amongst other things, may serve as a repository for storing data that is processed, received, or generated as a result of the execution of one or more modules in the module(s) 108.

The description hereinafter describes the estimation of direction of motion of a user on the mobile device 100 carried by the user. In an implementation, while the user is walking, the inertial sensor 112 in the mobile device 100 detects the motion of the user and generates a data stream of the acceleration signals corresponding to the motion of the user.

In one implementation, the data steam of acceleration signals can be obtained for time windows of a predetermined time period, say, 2-3 seconds, and these accelerations signals are used to measure the acceleration values across the three axes of the mobile device 100 from the acceleration signals captured by the inertial sensor 112 using known methods. The three axes of the mobile device 100 are illustrated in FIG. 1(*b*). As shown in FIG. 1(*b*), the three axes of the mobile device 100 includes 'x' axis, 'y' axis and 'z' axis. Acceleration values across all the three axes are obtained. The acceleration values, thus, obtained may be stored as acceleration values 126 within the data 110.

The measured acceleration values are then corrected by the bias removal module 116 and noise removal module 118 based on removing static bias and noise from the measured acceleration values. For the removal of the static bias, the static bias for the mobile device 100 is estimated, initially, by the static bias estimation module 114. The static bias estimation module 114 takes the acceleration values across all the three axes of the mobile device 100, when the mobile device 100 is at rest. Since the mobile device 100 is at rest, according to the equation of motion provided below as equation (1), displacement is equal to zero.

$$S = ut + \frac{1}{2}at^2 = 0 \qquad (1)$$

Wherein S=Displacement;
u=Velocity;
t=Time; and
a=Acceleration

Since the velocity 'u' is zero as the mobile device 100 is at rest, at every instance the total distance travelled $$S = \frac{1}{2}at^2 = 0 \text{ and } \frac{1}{2}at^2 - S = 0.$$

Now considering constant bias 'b' and replacing 'a' with 'b', following is obtained:

$$\frac{1}{2}bt^2 - S = 0 \qquad (2)$$

The equation (2) provided above is used independently for all the three axes of the mobile device 100 to estimate static bias '$b_x$', '$b_y$' and '$b_z$' according to the known least square estimation technique. In one implementation, the static bias estimation module 114 stores the estimated values of static bias as static bias 124 within data 110. The estimated static bias for the three axes is then subtracted from the measured acceleration values by the bias removal module 116 to remove the static bias.

After removal of the static bias, the noise removal module 118 removes the noise from the measured acceleration values based on making all the measured acceleration values in the predetermined range of a noise floor. In one implementation, the predetermined range of the noise floor is +/−0.012. As indicated above, the static bias removed and noise removed acceleration values are referred to as corrected acceleration values throughout the description. In one implementation, the corrected acceleration values are stored as corrected acceleration values 128 in the data 110.

Subsequent to removal of the static bias and noise, the direction estimation module 120 estimates the direction of the motion of the user. For the estimation of the direction of motion, the direction estimation module 120 determines the direction of gravity based on evaluating the gravity by filtering the corrected acceleration values along the three axes using a conventional low-pass filter, computing an absolute value of the gravity, which is compared with a predefined tolerance value along each axis to filter out the gravity components from the acceleration values. In one implementation, the predefined tolerance value is 22%. In said implementation, if the absolute value of the gravity along an axis is less than 22%, i.e., below the tolerance value, gravity components along that axis is ignored or filtered out. Determination of the absolute gravity enables determination of a plane orthogonal to the direction of gravity. Such a plane includes two orthogonal axes orthogonal to the direction of gravity.

Thereafter, the direction estimation module 120 evaluates values of displacement along the two orthogonal axes. The evaluation is based on receiving a user input for placement of the mobile device 100 with respect to body of the user. For example, the mobile device 100 may be placed in pocket of the shirt, pocket of the trouser, or pocket of the waist/in a phone holder tied to the waist of the user. In an example, the user may provide the user input for placement of the mobile device 100 with respect to the user's body. The direction estimation module 120 may store this user input as placement information 130 in the data 110. In case the placement of the mobile device 100 changes, an updated user input is received, and the placement information 130 may be updated accordingly.

Depending upon the placement of the mobile device 100 with respect to the user's body, the direction estimation module 120 performs scaling of the acceleration values by a value of +1/−1, along axis of motion. As described previously, the direction estimation module 120 scales, i.e., multiplies the acceleration values to −1, in case the mobile device 100 is placed in the upper half body of the user, say from head to waist, and scales the acceleration values to +1, if the mobile device 100 is placed in the lower half of the body, say below waist.

Subsequent to the scaling, the direction estimation module 120 integrates the acceleration values, i.e., corrected and scaled acceleration values across the three axes of the mobile device 100, with respect to time. The acceleration values are integrated with respect to time to obtain values of velocity, and the values of velocity undergo further integration with respect to time to obtain displacement values along the two orthogonal axes of the plane. In one implementation, the direction estimation module 120 stores the evaluated displacement values as displacement values 132 in the data 110.

The direction estimation module 120 then computes the ratio of the displacement values to estimate direction of motion of the user. The direction of motion is estimated in the form of an angle the user body is making with respect to the orthogonal axes of the plane orthogonal to the direction of the gravity. In one implementation, the direction estimation module 120 uses the following equation (3) to estimate the direction of motion of the user. In one implementation, the direction estimation module 120 stores the estimated direction of motion as direction information 134 in the data 110.

$$\theta = \tan^{-1}\left(\frac{D_x}{D_y}\right) \quad (3)$$

Wherein $\theta$=Direction of motion with respect to plane of the ground;
$D_x$=Displacement value along first orthogonal axis; and
$D_y$=Displacement value along second orthogonal axis.
The direction of motion estimated by the equation (3) provided above is relatively free from errors, in comparison to when done using raw acceleration values.

FIG. 2 illustrates a method 200 for estimation of direction of motion of users on mobile devices. The method 200 is implemented in a mobile device 100. The order in which the method 200 is described is not intended to be construed as a limitation, and any number of the described method blocks can be combined in any order to implement the method 200, or any alternative methods. Additionally, individual blocks may be deleted from the method 200 without departing from the spirit and scope of the subject matter described herein. Furthermore, the method 200 can be implemented in any suitable hardware.

The method 200 may be described in the general context of computer executable instructions. Generally, computer executable instructions can include routines, programs, objects, components, data structures, procedures, modules, functions, etc., that perform particular functions or implement particular abstract data types. Further, although the method 200 may be implemented in any mobile device having an inertial sensor; in an example described in FIG. 2, the method 200 is explained in context of the aforementioned mobile device 100, for the ease of explanation.

Referring to FIG. 2, at block 202, acceleration values across the three axes of the mobile device 100 is measured by the inertial sensor 112 in the mobile device 100. The acceleration values are measured across the three axes of the mobile device 100 from the acceleration signals captured by the inertial sensor using conventional methods. In an implementation, the acceleration signals, representing the motion of the user, are captured by the inertial sensor 112 in the form of a data stream. The data stream of the acceleration signals from the inertial sensor 112 is divided into time windows of a predetermined time period. The acceleration signals are then processed as per the time windows. Accordingly, the acceleration values obtained corresponding to the acceleration signals are processed one by one according to the time windows.

At block 204, static bias and noise is removed from the measured acceleration values to obtain corrected acceleration values. As known, the acceleration signals captured by the accelerometers are too noisy, and may include a static bias as well when the mobile device is at rest leading to inaccuracies in the measured acceleration values. The measured acceleration values are therefore corrected according the method 200 based on removing static bias and noise therefrom, prior to further processing.

At block 206, direction of gravity is determined based on the corrected acceleration values The direction of gravity is determined based on evaluating the gravity by filtering the corrected acceleration values along the three axes using a conventional low-pass filter, and computing an absolute value of the gravity, which is compared with a predefined tolerance value along each axis to filter out the gravity components from the acceleration values. In one implementation, the predefined tolerance value is 22%. In said implementation, if the absolute value of the gravity along an axis is less than 22%, i.e., below the tolerance value, gravity components along that axis is ignored or filtered out.

At block 208, a plane orthogonal to the direction of gravity is determined, using a rotation matrix of the mobile device. Such a plane includes two orthogonal axes, say, an 'x' axis and a 'y' axis. Both the 'x' and 'y' axis being orthogonal to the direction of gravity.

At block 210, displacement values along the two orthogonal axes of the plane are evaluated based on a user input for placement of the mobile device with respect to user's body, and integration of corrected acceleration values with respect to time. In one implementation, depending upon the placement of the mobile device with respect to the user's body, a step of scaling the acceleration values by a +1/−1 is performed. According to said implementation, if the mobile device 100 is placed in the upper half body of the user, say from head to waist, then the acceleration values are scaled to −1, and if the mobile device 100 is placed in the lower half of the body, say below waist, the acceleration values are scaled to +1, along the axis of user motion.

Subsequent to the scaling, the acceleration values, i.e., the corrected and scaled acceleration values are integrated with respect to time. The acceleration values are integrated with respect to time to obtain values of velocity, and the values of velocity undergo further integration with respect to time to obtain displacement values along the two orthogonal axes of the plane.

At block 212, direction of motion of the user is estimated based on a ratio of the displacement values evaluated in the previous method block.

Although implementations for the mobile device for estimation of direction of motion of user and the method for estimation of direction of motion of users on mobile devices are described, it is to be understood that the present subject matter is not necessarily limited to the specific features or methods described. Rather, the specific features and methods are disclosed as implementations to estimation of direction of motion of users on mobile devices.

We claim:

1. A method for estimation of direction of motion of a user on a mobile device, wherein the mobile device is carried by the user while walking, the method comprising:
measuring, by an inertial sensor in the mobile device, a data stream of acceleration values across three axes of the mobile device, the data stream being representative of the motion of the user;
receiving an user input regarding placement of the mobile device with respect to the user's upper half body or lower half body;
removing static bias and noise from the acceleration values to obtain corrected acceleration values across the three axes of the mobile device, wherein the static bias is removed based on an estimation of the static bias for the three axes of the mobile device when the mobile device is at rest;
filtering the corrected acceleration values along the three axes of the mobile device using a low-pass filter to obtain an absolute gravity for each of the three axes of the mobile device;
determining a direction of gravity by filtering out gravity components from the corrected acceleration values, wherein the gravity components correspond to the acceleration values contributed by acceleration due to gravity along the three axes of the mobile device
identifying a plane orthogonal to the direction of gravity, wherein the direction of gravity so determined enables the identification of the plane orthogonal to the direction of gravity, wherein the orthogonal plane includes two axes being orthogonal to the direction of gravity;
determining corrected displacement values along the each of the two orthogonal axes based on the user input for placement of the mobile device with respect to user's upper half body or lower half body and based on integration of the corrected acceleration values across the two orthogonal axes with respect to time, wherein the mobile device experiences opposite force generated in the upper half or lower half of the user's body due to the walk of the user, based on the placement of the mobile device either in the upper half or in the lower half of the user's body, wherein the influence of the force experienced by the mobile device based on the position of the mobile device on the displacement values is nullified by scaling the corrected acceleration values by a predetermined value, wherein the predetermined value being determined based on the user input regarding placement of the mobile device with respect to the user's upper half body or lower half body to obtain scaled acceleration values, wherein the predetermined value is −1 if the mobile device is placed in the upper half of the user's body, and the predetermined value is +1 if the mobile device is placed in the lower half of the user's body, along an axis of the user's motion;
integrating the corrected and scaled acceleration values across three axes of the mobile device with respect to time to obtain values of velocity, and further integrating the values of velocity with respect to time to obtain corrected displacement values along the two orthogonal axes of the plane; and
estimating the direction of motion of the user based on a ratio of the corrected displacement values along the two orthogonal axes, wherein the direction of motion is estimated in the form of an angle that the direction of motion of the user body makes with respect to the axes of the planes orthogonal to the direction of the gravity.

2. The method as claimed in claim 1, wherein the acceleration values are measured in a plurality of time windows of a predetermined time period.

3. The method as claimed in claim 1, wherein the static bias is estimated, based on the acceleration values measured when the mobile device is at rest, using a least square estimation technique.

4. A mobile device for estimation of direction of motion of a user, wherein the mobile device is carried by the user while walking, the mobile device comprising:
a processor to receive an user input regarding placement of the mobile device with respect to the user's upper half body or lower half body;
an inertial sensor to capture acceleration signals based on the motion of the user to measure acceleration values across three axes of the mobile device;
a bias removal module to remove static bias from the acceleration values based on an estimation of the static bias for the three axes of the mobile device when the mobile device is at rest;
a noise removal module to further remove noise from the acceleration values to get corrected acceleration values across the three axes of the mobile device;
a direction estimation module coupled to the processor, to:
filter the corrected acceleration values along the three axes of the mobile device using a low-pass filter to obtain an absolute gravity for each of the three axes of the mobile device and determine a direction of gravity by filtering out gravity components from the corrected acceleration values, wherein the gravity components correspond to the acceleration values contributed by acceleration due to gravity along the three axes of the mobile device,
identify a plane orthogonal to the direction of gravity, wherein the direction of gravity so determined enables the identification of the plane orthogonal to the direction of gravity, wherein the orthogonal plane includes two axes being orthogonal to the direction of gravity;
determine corrected displacement values along the each of the two orthogonal axes based on the user input for placement of the mobile device with respect to user's upper half body or lower half body and based on integration of the acceleration values across the two orthogonal axes with respect to time, wherein the mobile device experiences opposite force generated in the upper half or lower half of the user's body due to the walk of the user, based on the placement of the mobile device either in the upper half or in the lower half of the user's body, wherein the influence of the force experienced by the mobile device based on the position of the mobile device on the displacement values is nullified by scaling the corrected acceleration values by a predetermined value, wherein the predetermined value being determined based on the user input regarding placement of the mobile device with respect to the user's upper half body or lower half body to obtain scaled acceleration values, wherein the predetermined value is −1 if the mobile device is placed in the upper half of the user's body, and the predetermined value is +1 if the mobile device is placed in the lower half of the user's body, along an axis of the user's motion;

integrate the corrected and scaled acceleration values across three axes of the mobile device with respect to time to obtain values of velocity, and further integrate the values of velocity with respect to time to obtain corrected displacement values along the two orthogonal axes of the plane; and estimate the direction of motion of the user based on a ratio of the corrected displacement values along the two orthogonal axes, wherein the direction of motion is estimated in the form of an angle that the direction of motion of the user body makes with respect to the axes of the planes orthogonal to the direction of the gravity.

5. The mobile device as claimed in claim 4, wherein the inertial sensor is an accelerometer.

6. The mobile device as claimed in claim 4, wherein the inertial sensor captures the acceleration signals as a data stream in a plurality of time windows of a predetermined time period.

7. A non-transitory computer readable medium having a set of computer readable instructions that, when executed, cause a mobile device to execute a method for estimation of motion of a user on a mobile device, wherein the mobile device is carried by the user while walking, the method comprising:

measuring, by an inertial sensor in the mobile device, a data stream of acceleration values across three axes of the mobile device, the data stream being representative of the motion of the user;

receiving an user input regarding placement of the mobile device with respect to the user's upper half body or lower half body;

removing static bias and noise from the acceleration values to obtain corrected acceleration values across the three axes of the mobile device; wherein the static bias is removed based on an estimation of the static bias for the three axes of the mobile device when the mobile device is at rest;

filtering the corrected acceleration values along the said three axes of the mobile device using a low-pass filter to obtain an absolute gravity for each of the three axes of the mobile device;

determining a direction of gravity by filtering out gravity components from the said corrected acceleration values, wherein the gravity components correspond to the acceleration values contributed by acceleration due to gravity along the three axes of the mobile device;

identifying a plane orthogonal to the direction of gravity, wherein the direction of gravity so determined enables the identification of the plane orthogonal to the direction of gravity, wherein the orthogonal plane includes two axes being orthogonal to the direction of gravity;

determining corrected displacement values along the each of the two orthogonal axes based on the user input for placement of the mobile device (100) with respect to user's upper half body or lower half body and based on integration of the corrected acceleration values across the two orthogonal axes with respect to time, wherein the mobile device experiences opposite force generated in the upper half or lower half of the user's body due to the walk of the user, based on the placement of the mobile device either in the upper half or in the lower half of the user's body, wherein the influence of the force experienced by the mobile device based on the position of the mobile device on the displacement values is nullified by scaling the corrected acceleration values by a predetermined value, wherein the predetermined value being determined based on the user input regarding placement of the mobile device with respect to the user's upper half body or lower half body to obtain scaled acceleration values, wherein the predetermined value is −1 if the mobile device is placed in the upper half of the user's body, and the predetermined value is +1 if the mobile device is placed in the lower half of the user's body, along an axis of the user's motion;

integrating the corrected and scaled acceleration values across three axes of the mobile device with respect to time to obtain values of velocity, and further integrating the values of velocity with respect to time to obtain corrected displacement values along the two orthogonal axes of the plane; and estimating the direction of motion of the user based on a ratio of the corrected displacement values along the two orthogonal axes, wherein the direction of motion is estimated in the form of an angle that the direction of motion of the user body makes with respect to the axes of the planes orthogonal to the direction of the gravity.

\* \* \* \* \*